J. A. DORAN.
PIN JOINT.
APPLICATION FILED FEB. 24, 1914.
1,156,763.
Patented Oct. 12, 1915.
Fig. 1.
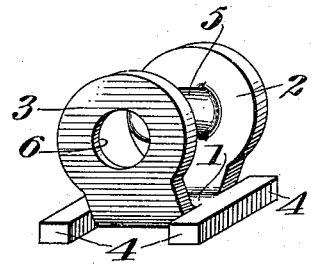
Fig. 2.
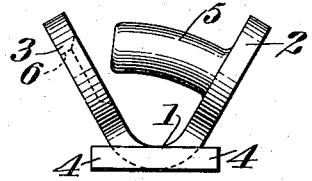
Fig. 3.
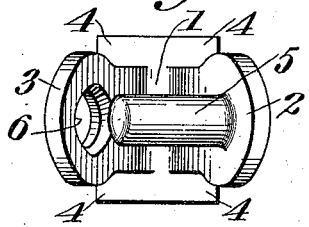
Fig. 4.
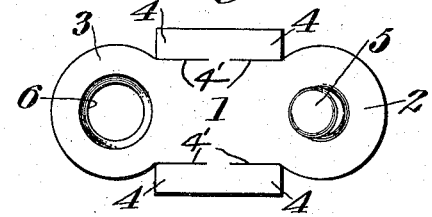
Fig. 5.
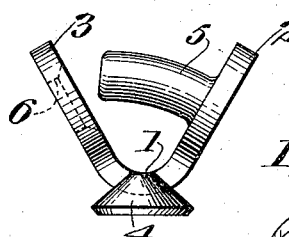
Fig. 6.
Fig. 7.
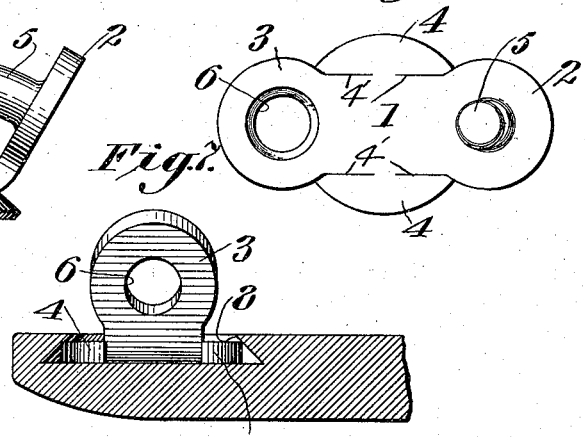
Fig. 8.
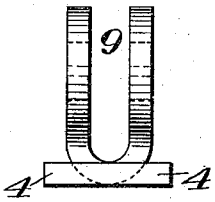
Fig. 9.
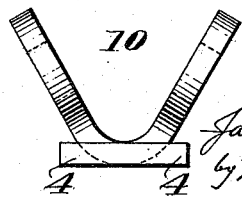
WITNESSES
INVENTOR
James A. Doran
by Wm. H. Finckel
Atty.

UNITED STATES PATENT OFFICE.

JAMES A. DORAN, OF PROVIDENCE, RHODE ISLAND.

PIN-JOINT.

1,156,763. Specification of Letters Patent. Patented Oct. 12, 1915.

Application filed February 24, 1914. Serial No. 820,684.

*To all whom it may concern:*

Be it known that I, JAMES A. DORAN, a citizen of the United States, residing at Providence, in the county of Providence and State of Rhode Island, have invented a certain new and useful Improvement in Pin-Joints, of which the following is a full, clear, and exact description.

The preferred and most practical joints or bearings for the pins or tongues of brooches and other like fastening devices, are usually made as separate articles comprising upstanding ears and a connecting base and attached to the back of the body of the brooch or other device by soldering and other means, and they have such small attaching bases that great care has to be exercised in properly locating them and in steadying them in and during the operation of attaching them.

The object of this invention is to provide a larger base for such joints or bearings than heretofore used in order to aid in properly and readily applying such joints or bearings and thus save time and labor in manufacturing.

Without thereby limiting the scope of the invention, I will proceed to explain the invention as applied to several forms of such pin-joints.

The invention consists of a pin-joint of the character described, having, preferably, as a unitary and integral part, certain lateral extensions of its base, which serve to aid the workman in locating the joint on the device to which it is to be applied, and to steady it during the operation of fixing it upon or to the article.

In the accompanying drawings illustrating the invention, in the several figures of which like parts are similarly designated, Figure 1 is a perspective view showing the invention as applied to a pin-joint of one of the specific types exhibited in my Patent No. 1,086,657, granted February 10, 1914; Fig. 2 is a front elevation, and Fig. 3 is a top plan view of the same, all of these views showing the joint in open position to receive the pin-tongue. Fig. 4 is a plan view of the joint before its ears or sides are bent up. Fig. 5 is a front elevation showing the joint with a cupped, or, as termed in the shops, a "dapped" base; Fig. 6 is a plan view thereof before bending, and Fig. 7 shows one use that may be made of this construction. Fig. 8 is a front elevation showing a joint in which the pin is fixed by a separate rivet. Fig. 9 is a front elevation of a joint designed for use with a pin-tongue carrying its pivot which is riveted in the joint's ears or sides.

The joint comprises a base 1, ears or sides 2 and 3, and the similar or substantially equal base extensions 4 projecting from the base beyond said ears. As shown in Figs. 1 to 7, one of the ears or sides has the integrally drawn pivot-rivet 5 adapted to engage a hole 6 in the opposite ear or side in order to attach the pin-tongue (not shown, but of any usual or known construction), in a pivotal manner, and also to unite and rivet together the two ears or sides. As shown in Fig. 4 the lateral base extensions 4 may be blanked out simultaneously with the formation of the base and ears, and without material waste, the blank being slitted, as at 4′, from opposite ends toward the center and upon opposite sides to form the ears and leaving a central portion between the ears to constitute a web for connecting the bases of the ears, said ears being bent upwardly to receive the pin-tongue, and the base extensions remaining in their flat condition at the front and rear of the ears. These extensions are similar or substantially equal upon opposite sides of the ears and so enlarge the base area that the workman has no difficulty in locating or setting and fixing the joint upon the article to which it is to be applied, and the joint will not topple over while being applied. Any usual or approved attaching medium, such as solder, may be used to apply the joint to the article.

As shown in Figs. 5, 6 and 7, the similar or substantially equal base extensions may be circular and cupped, thus furnishing a construction readily applicable to an article, 7, having an undercut recess 8 to receive it and in which the base is flattened out, as in Fig. 7, in order to engage the overhang of the recess. Where a joint having a circular base is to be used on a flat plane surface, the circular base may be flat, and by this I mean that the base extension may be flat in the first instance, instead of being first cupped and then flattened.

As shown in Fig. 8, the base extensions may be applied to the common form of joint 9, where the pin-tongue is applied by means of a separate rivet.

As shown in Fig. 9, the invention is also applicable to that form of joint 10, wherein the pin-tongue has its rivet made with it or applied to it, and as thus equipped is placed between the ears of the joint and these ears closed in upon the pin-tongue, so that its rivet will enter the holes in opposite ears and may be then upset to secure the pin-tongue in place and also secure the ears together.

Generally stated, the provision of the laterally extended base is applicable not only to these but also to other types of pin-joints and the like, and the shape of the base may be varied to suit the requirements of the trade.

While I have herein referred to the base extensions as lateral, it is obvious that they are also forward and rearward extensions, and it is within my invention to vary the area of extension in any or all directions.

The invention is not limited to the material from which the joints are made, as it is applicable to joints made of any material. The joint and the brooch or other article on which it is used may be of the same material.

By constructing the joint as a unitary or individual part, it will be seen that in fixing it to a brooch or other article, it is not necessary that the joint be positioned in any particular manner, excepting that its ears should be arranged in proper relation to the pin-catch to be used in connection with the pin to be fixed in the joint. In other words, the joint is reversible with relation to its complemental pin-catch.

What I claim is:—

1. As an article of manufacture, a pin-joint, comprising a single piece having ear and base extension portions, said piece slitted from its ends toward the center and upon opposite sides to form the ears with a connecting web at their bases, said ears extending upwardly to receive a pin-tongue, and the remaining portion forming similar or substantially equal base extensions of the connecting web at the front and rear of said ears and projecting beyond the ears upon opposite sides, said joint adapted to be set and positioned upon an article and sustained in position by said base extensions while being soldered to said article.

2. As an article of manufacture, a pin-joint, comprising a single piece, having ear and base extension portions, said piece slitted from its ends toward the center and upon opposite sides to form the ears with a connecting web at their bases, said ears extending upwardly to receive a pin-tongue, and the remaining portion of the piece left flat and forming similar or substantially equal base extensions of the connecting web at the front and rear of said ears and projecting beyond the ears upon opposite sides, said joint adapted to be set and positioned upon an article and sustained in position by said base extensions while being soldered to said article.

In testimony whereof I have hereunto set my hand this 20th day of February A. D. 1914.

JAMES A. DORAN.

Witnesses:
JAMES H. HIGGINS,
EBER FORBES.

Copies of this patent may be obtained for five cents each, by addressing the "Commissioner of Patents, Washington, D. C."